US007769510B2

(12) United States Patent
Denholm et al.

(10) Patent No.: US 7,769,510 B2
(45) Date of Patent: Aug. 3, 2010

(54) IDENTIFICATION OF WIRELESS SENSORS

(75) Inventors: Timothy James Henry Denholm, Warwickshire (GB); Jonathan David Wood, West Yorkshire (GB)

(73) Assignee: Cummins Intellectual Properties, Inc., Minneapolis, MN (US)

( * ) Notice: Subject to any disclaimer, the term of this patent is extended or adjusted under 35 U.S.C. 154(b) by 0 days.

(21) Appl. No.: 12/332,943

(22) Filed: Dec. 11, 2008

(65) Prior Publication Data

US 2010/0152947 A1 Jun. 17, 2010

(51) Int. Cl.
*G01M 17/00* (2006.01)

(52) U.S. Cl. ........................................................ 701/34

(58) Field of Classification Search ................... 701/34, 701/36, 45; 73/1.15, 1.82

See application file for complete search history.

(56) References Cited

U.S. PATENT DOCUMENTS

2007/0225872 A1* 9/2007 Luebke et al. .................. 701/1

OTHER PUBLICATIONS

"Micro-generator feeds on good vibrations" by Will Knight; published on Jun. 5, 2007; posted on NewScientist.com on Jul. 4, 2007; 3 pages.

* cited by examiner

*Primary Examiner*—Kim T Nguyen
(74) *Attorney, Agent, or Firm*—Studebaker & Brackett PC; Tim L. Brackett, Jr.; J. Bruce Schelkopf

(57) ABSTRACT

A method and system for identifying sensors is disclosed. In one embodiment, the method includes receiving a list of sensors that are differentiated by function and/or location, and detecting a plurality of sensors in a vehicle environment, where at least some of the sensors are identical. The method also includes receiving information from each of the plurality of sensors, and identifying each of a plurality of identical sensors as corresponding to a respective sensor in the list of sensors. The identification may be based on one or more of: a proximity of each sensor relative to at least one wireless receiver; at least one characteristic of information received from the sensors, that is caused by an actively induced change in the vehicle environment; and at least one characteristic of information received from the sensors, that is caused by a passive change in the vehicle environment. According to the method and system disclosed herein, sensors in the vehicle are detected and identified in a simple and cost effective manner.

20 Claims, 11 Drawing Sheets

| 502 | 504 Sensor | 506 A | B | C | 508 Sensor Type | 510 Data-trend | 512 Identified on stage |
|---|---|---|---|---|---|---|---|
| 1 | Exhaust manifold | ✓ | ✓ | | T | | 4 |
| 2 | Exhaust pipe | ✓ | | | T | | 4 |
| 3 | Exhaust filter inlet | ✓ | | | T | | 4 |
| 4 | Exhaust filter outlet | ✓ | | | T | | 4 |
| 5 | Rear right tire | ✓ | | | P | | 3 |
| 6 | Rear left tire | ✓ | | | P | | 3 |
| 7 | Fuel Gauge | ✓ | | | Unique | N/A | 1 |
| 8 | Engine water outlet | | ✓ | | T | | 4 |
| 9 | Radiator inlet | | ✓ | | T | | 4 |
| 10 | Radiator outlet | | ✓ | | T | | 4 |
| 11 | Water pump | | ✓ | | T | | 4 |
| 12 | Oxygen sensor | | ✓ | | Unique | N/A | 1 |
| 13 | Front right tire | ✓ | ✓ | | P | | 3 |
| 14 | Front left tire | ✓ | ✓ | | P | | 3 |
| 15 | Reversing sensor | | | ✓ | Unique | N/A | 1 |
| 16 | Driver seat sensor | | | ✓ | T | High pressure | 2 |
| 17 | Passenger seat | | | ✓ | T | High signal strength | 2 |
| 18 | Rear right seat | | | ✓ | T | Medium signal strength | 2 |
| 19 | Rear left seat | | | ✓ | T | Low signal strength | 2 |
| 20 | Interior environment | | | ✓ | Unique | N/A | 1 |
| 21 | Driver Alertness | | ✓ | ✓ | Unique | N/A | 1 |

500

| Location/Type | Temp. | Pressure | Vibration | Noise | Other |
|---|---|---|---|---|---|
| Engine outer | x | | x | x | |
| Flywheel | | | x | | |
| Turbine housing | x | x | x | | Failure |
| Compressor housing | x | x | x | x | |
| Exhaust | x | x | x | x | |
| Water housing | x | x | | | Fill-level |
| Water pipes | x | x | | | |
| Oil feed lines | x | x | | | |
| Wheels/Tyres | x | x | x | | Rotation |
| Drive/Cam-belt wheels | x | | x | x | |
| Doors/windows | | | | | Angle, gap |
| Outside of vehicle | x | | | | Proximity Rain |
| Inside vehicle | x | | | | Passenger alertness, passenger weight |

200

Figure 2

502 504 506 508 510 512

| | Sensor | A | B | C | Sensor Type | Data-trend | Identified on stage |
|---|---|---|---|---|---|---|---|
| 1 | Exhaust manifold | ✓ | ✓ | | T | | 4 |
| 2 | Exhaust pipe | ✓ | | | T | | 4 |
| 3 | Exhaust filter inlet | ✓ | | | T | | 4 |
| 4 | Exhaust filter outlet | ✓ | | | T | | 4 |
| 5 | Rear right tire | ✓ | | | P | | 3 |
| 6 | Rear left tire | ✓ | | | P | | 3 |
| 7 | Fuel Gauge | ✓ | | | Unique | N/A | 1 |
| 8 | Engine water outlet | | ✓ | | T | | 4 |
| 9 | Radiator inlet | | ✓ | | T | | 4 |
| 10 | Radiator outlet | | ✓ | | T | | 4 |
| 11 | Water pump | | ✓ | | T | | 4 |
| 12 | Oxygen sensor | | ✓ | | Unique | N/A | 1 |
| 13 | Front right tire | ✓ | ✓ | | P | | 3 |
| 14 | Front left tire | ✓ | ✓ | | P | | 3 |
| 15 | Reversing sensor | | | ✓ | Unique | N/A | 1 |
| 16 | Driver seat sensor | | | ✓ | T | High pressure | 2 |
| 17 | Passenger seat | | | ✓ | T | High signal strength | 2 |
| 18 | Rear right seat | | | ✓ | T | Medium signal strength | 2 |
| 19 | Rear left seat | | | ✓ | T | Low signal strength | 2 |
| 20 | Interior environment | | | ✓ | Unique | N/A | 1 |
| 21 | Driver Alertness | | ✓ | ✓ | Unique | N/A | 1 |

500

Figure 5

IDENTIFICATION OF WIRELESS SENSORS

FIELD OF THE INVENTION

The present invention relates to engine systems, and more particularly to a method and system for identifying sensors.

BACKGROUND OF THE INVENTION

Sensors are used in vehicles such as cars and trucks to deliver information such as speed, temperature, etc. to the driver of the vehicle. A problem with sensors is that they require both power and data cables in order function properly. Installation of sensors in vehicles entails parts and installation costs, and the cables tend to add clutter to the vehicle.

One way to reduce parts and fitting costs, and clutter of sensors is to use wireless sensors. However, if there are several sensors in a particular area of the vehicle (e.g., the engine compartment), it may be difficult to differentiate the sources of particular signals. One way to differentiate sensors would be to make each sensor unique. However, using unique sensors increases complexity and cost for the overall system.

Accordingly, what is needed is a simple and cost effective method and system for identifying sensors. The present invention addresses such a need.

SUMMARY OF THE INVENTION

A method and system for identifying sensors are disclosed. In one embodiment, the method includes receiving a list of sensors that are differentiated by function and/or location, and detecting a plurality of sensors in a vehicle environment, where at least some of the sensors are identical. The method also includes receiving information from each of the plurality of sensors, and identifying each of a plurality of identical sensors as corresponding to a respective sensor in the list of sensors. The identification may be based on one or more of: a proximity of each sensor relative to at least one wireless receiver; at least one characteristic of information received from the sensors, that is caused by an actively induced change in the vehicle environment; and at least one characteristic of information received from the sensors, that is caused by a passive change in the vehicle environment. According to the method and system disclosed herein, sensors in the vehicle are detected and identified in a simple and cost effective manner.

BRIEF DESCRIPTION OF THE DRAWINGS

FIG. 2 is an example table showing possible locations and types of sensors in the vehicle of FIG. 1 in accordance with one embodiment.

FIG. 5 is a list of sensors in accordance with one embodiment.

DETAILED DESCRIPTION OF THE INVENTION

Definitions

Figure 1:
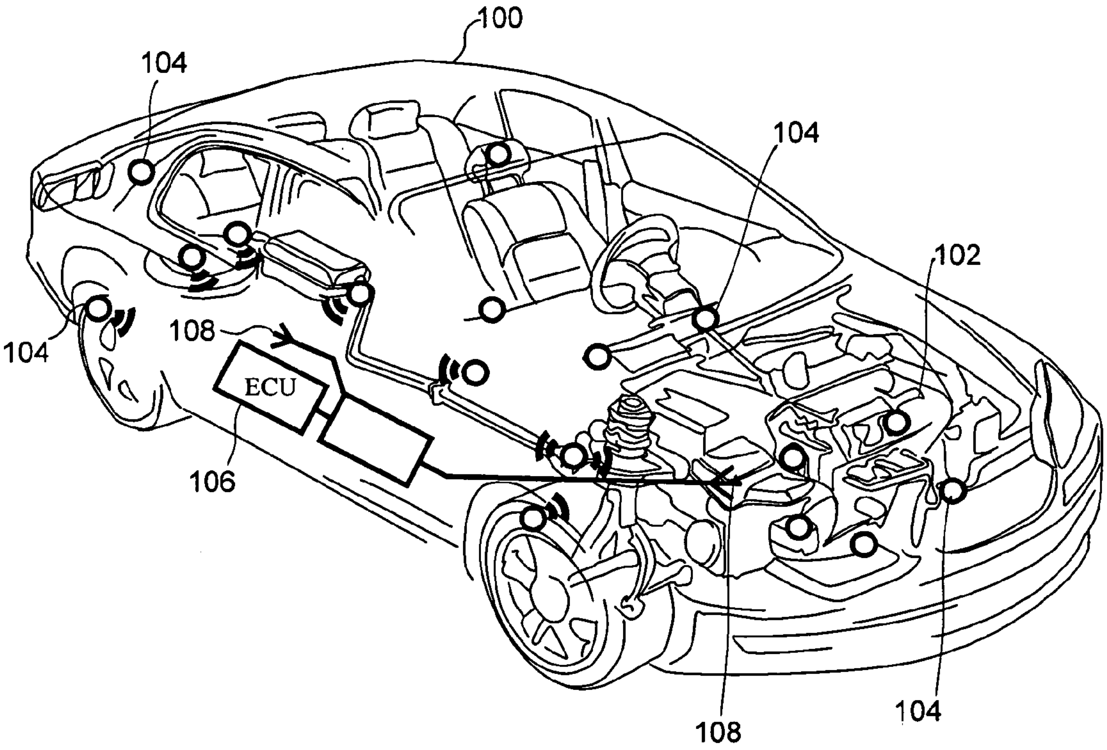
FIG. 1 is a diagram of a vehicle in accordance with one embodiment.

The following terms are defined in accordance the embodiments described herein.

The term "sensor" may include a single-function sensor, a multifunction sensor, a group or cluster of proximate sensors and devices that are operable to determine a measure of the energy available to them. Sensors may be described herein as transmitting data. However, the sensors may also perform two-way communication, for example, to control the sequence of data transmissions from the sensors or to receive requests for data.

The term "list of sensors" may include a database and/or a look-up table, and may include substitute means and substitute operations, including the storage or transmission of data, including data in centralized or disparate locations, from which such a list may be generated.

The term "identical" may indicate that there is insufficient identification information for a wireless receiver to distinguish respective functions of some sensors. For example, sensors may have a unique number (such as a Media Access Control (MAC) address), but the electronic control unit does not have data regarding which unique number corresponds to which sensor location and/or function. The term "identical" may also mean that the sensors are of identical construction. The term "identical" may also mean that the sensors do not have unique identifying numbers (such as a MAC address). The term "identical" may mean that the sensors are of identical construction and either do not have unique identifying numbers, do not provide unique identifying numbers, or that at the time of identifying the sensors such unique identifying numbers are not available, or that information is not available as to which unique identifying number corresponds to which sensor.

The term "receiver" or "transceiver" may indicate a wireless communication device used by an electronic control unit or central processing unit, for both requesting and receiving information.

The term "wireless" may include transmission from an arbitrary position through a two-dimensional medium such as a natural or artificial skin, and may include short range and medium range radio transmission formats as well as ultrasound, infrared, etc. Future communication modes may include terahertz radiation and future power transmission that may include wireless magnetic coupling in excess of the short distances possible with passive radio frequency identification technology.

Embodiments of the Present Invention

The present invention relates to engine systems, and more particularly to a method and system for identifying sensors. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for identifying sensors are disclosed. In particular embodiments, an electronic control unit detects wireless sensors in a vehicle environment using one or more wireless receivers. The electronic control unit identifies each of the sensors by matching information provided by each of the sensors to expected information from a list of sensors expected to be located in the vehicle environment. The electronic control unit may identify each of the sensors based on: the type of information provided by each sensor (e.g., temperature); the proximity of each sensor relative to at least one wireless receiver; at least one characteristic of the information that is caused by an actively induced change in the vehicle environment (e.g., turning on the engine); and at least one characteristic of the information that is caused by a passive change in the vehicle environment (e.g., an increase in temperature). As a result, sensors in the vehicle are detected and identified in a simple and cost effective manner. To more particularly describe the features of the present invention, refer now to the following description in conjunction with the accompanying figures.

FIG. 1 is a diagram of a vehicle 100 in accordance with one embodiment. As FIG. 1 shows, the vehicle 100 includes an engine system 102, sensors 104, and an electronic control unit (ECU) 106. The vehicle 100 also includes receivers 108 that are controlled by the ECU 106. Although embodiments of the present invention disclosed herein may be applied in the context of vehicles such as cars, embodiments of the present invention may also apply to other vehicles, such as trucks, and also have non-vehicle applications, and still remain within the spirit and scope of the present invention. For example, the engine system 102 may be part of a vehicle, a generator set, or other engine application, etc.

In one embodiment, the sensors 104 may be located on stationary or moving parts of the vehicle 100, and may be located inside or outside particular parts such as water/air conduits, etc. FIG. 2 is an example table 200 showing possible locations and types of sensors 104 in the vehicle 100 of FIG. 1 in accordance with one embodiment. For example, as FIG. 2 shows, temperature, vibration, and noise sensors may be located at the outer portion of the engine. Also, at the turbine housing, there may be temperature and vibration sensors, as well as a specialized sensors for detecting failures in the turbine housing.

In one embodiment, most or all of the sensors 104 are wireless sensors. In particular embodiments, the sensors 104 may operate using various competing wireless communication formats such as Bluetooth, Wifi/IEEE802.xx formats, active RFID tag formats, infrared, ultrasound, etc. The sensors 104 may use short to medium range radio signals to communicate with one or more receivers 108 distributed throughout the vehicle. In one embodiment, the receivers 108 are wireless receivers. The sensors 104 may be powered by electricity or by vibration. The sensors may be powered by locally scavenged energy (such as ambient sound, light, waste heat, or vibration). The sensors may be powered using short range wireless (induction) power, or longer range wireless power (e.g., using resonant receivers accepting narrow band magnetic field such as described in Science Express 7 Jun. 2007, page 1, which is incorporated herein by reference). In one embodiment the sensors are powered by energy from mechanical or principally magnetic oscillations. In one embodiment the sensors are powered by energy generated within and transmitted and distributed across a vehicle, which may be generated substantially in one location and received at a plurality of distributed locations. In one embodiment the sensors are provided with respective energy receivers tuned to resonate at a narrow frequency band. In particular embodiments, sensors that are powered by vibration have a dedicated vibration powered energy source. Vibration powered sensors are useful because vibration a form of power that will always correspond to the vehicle being turned on or being in motion. Other forms of power may not be as reliable (e.g., solar power, waste heat recovery, batteries, etc.).

The sensors 104 may broadcast some or all of the following: battery/capacitor charge level, their wireless output power/signal strength, amount of vibration they are receiving, peak frequency band of the vibration (or other vibration spectrum information), temperature, pressure, etc. As described in more detail below, an electronic control unit detects and identifies some or all of the sensors located in the vehicle environment based on information provided by each sensor.

Figure 3:
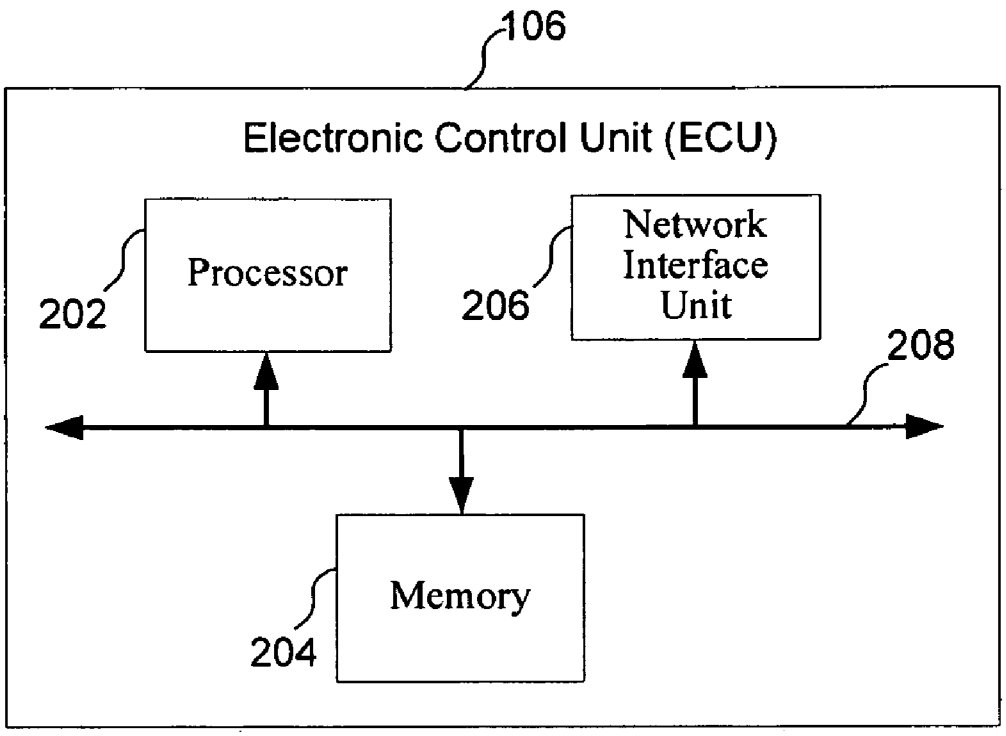
FIG. 3 is a block diagram of the electronic control unit of FIG. 1 in accordance with one embodiment.

FIG. 3 is a block diagram of the ECU 106 of FIG. 1 in accordance with one embodiment. As FIG. 3 shows, the ECU 106 may include a processor 202, a memory 204, and a network interface unit 206, all of which may be connected by a bus 208. The network interface unit 206 includes or may be associated with one or more receivers 108 having one or more antennas that enable the ECU 106 to exchange (e.g., transmit and receive) information or data with each of the sensors 104. The receivers 108 are distributed in various locations around the vehicle environment.

Figure 4:
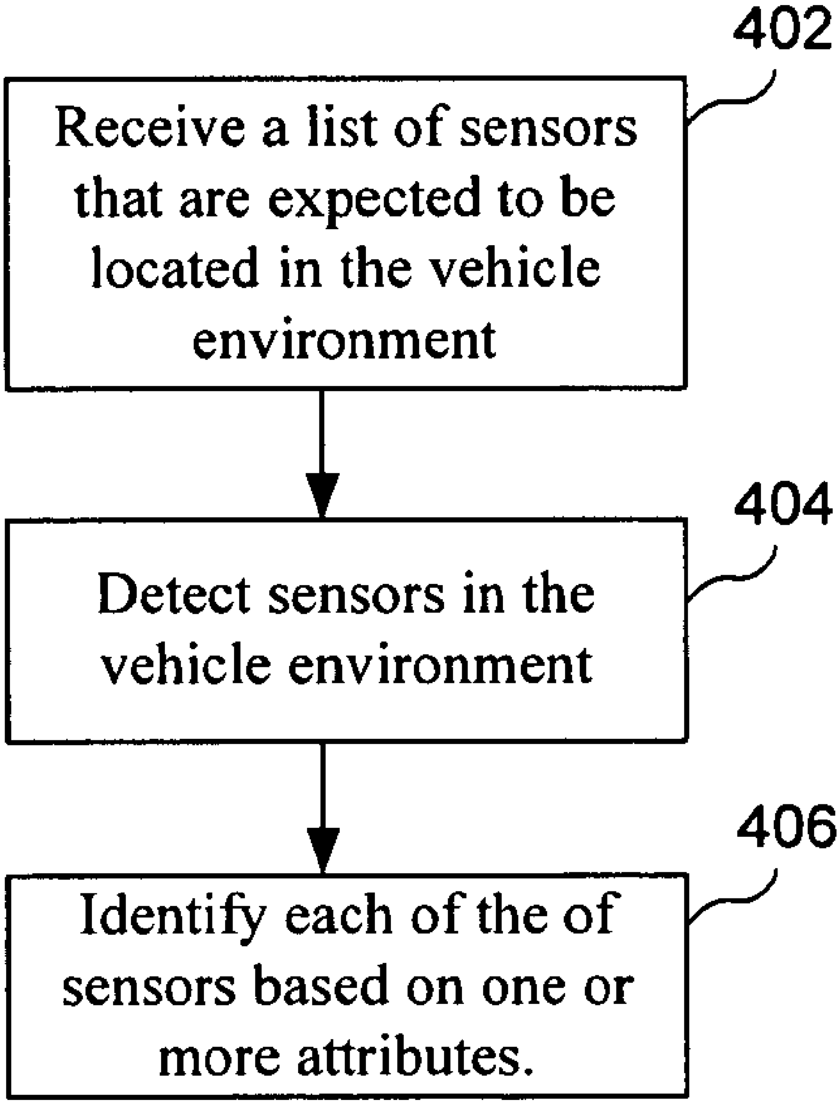
FIG. 4 is a flow chart showing a method for identifying sensors in accordance with one embodiment.

FIG. 4 is a flow chart showing a method for identifying sensors in accordance with one embodiment. Referring to both FIGS. 1 and 4, the process begins in step 402 where the ECU 106 receives a list of sensors that are expected to be located in the vehicle environment. FIG. 5 is a list of sensors 500 in accordance with one embodiment. As FIG. 5 shows, in one embodiment, the list of sensors 500 may be a look-up table. As described in more detail below, the sensors are differentiated by function and/or location, and some of the sensors are identical. For a given sensor 104, the list of sensors 500 includes one or more sensor identifiers, which may include a sensor identification number (in column 502) and a sensor name (in column 504). The look-up table 500 may also include particular receivers 108 (labeled A, B, and C in column 506) that are expected to detected a given sensor 104, a sensor type (in column 508), one or more characteristics (in column 510) (labeled "Data-trend"), and a stage during which the sensor was identified (in column 512). In one embodiment, the characteristics may include temperature, noise, vibration, signal strength, etc.

Referring again to FIG. 4, in step 404 the ECU 106 detects sensors in the vehicle environment. More specifically, in one embodiment, the ECU 106 scans one or more wireless communication bands for local sensors. In one embodiment, when the engine of the vehicle 100 is started, the sensors power up and start transmitting information, or data, relating to their immediate environment. Such data may include, for example, vibration, noise, temperature, etc. The ECU 106 detects sensors as the ECU 106 receives the signals containing information transmitted by those sensors. In one embodiment, the ECU 106 generates a list of the detected sensors and may assign and include a unique identifier such as a Media Access Control (MAC) address in the list. In one embodiment, once data communication between the sensors and the ECU 106 has been initiated, the ECU 106 may automatically assign an encryption code to be used thereafter.

In one embodiment, a data-trace may be cached on a given sensor to be sent as a data packet rather than just a single value. The sensor may send the data packet periodically, depending on the sensor. For example, once every 1 to 5 seconds may be appropriate for some sensors, and 10 to 100 times a second may be appropriate for other sensors. In one embodiment, to achieve this, the ECU 106 requests data by cycling through the addresses that it has assigned. This limits signal interference among sensors.

The following are detailed embodiments of the scanning stage. In particular embodiments, the sensors 104 may have identifier numbers such as serial numbers, physical address numbers, MAC addresses, or the equivalent, etc. Sensors 104 that do not have identifier numbers may each generate a random number or code upon initial activation (e.g., using a pseudo-random number generator with a seed based on an interval of sensor data). The generated number or code has a sufficient number of digits (e.g., a twelve-digit hexadecimal number) to make it almost impossible for two sensors 104 in the vehicle environment to have the same number. This enables the ECU 106 to communicate with a specific sensor 104.

In one embodiment, the ECU 106 replies (e.g., a ping request) to one or more sensors 104. In one embodiment, if there is interference due to multiple replies, the ECU 106 may request replies from only a subgroup of the possible identifier numbers (e.g., those identifier numbers beginning with "0," then those beginning with "1," etc.). In one embodiment, the sensors 104 may be programmed or instructed to reply after a random amount of time. In one embodiment, a given sensor 104 may be programmed to delay replying based on a value of a parameter that the sensor 104 measures.

In one embodiment, as the ECU 106 receives one or more coherent replies, the ECU 106 may assign a new identifier number to each of the sensors. The identifier number may be a local area network (LAN) address or the equivalent. For example, the list of sensors 500 shows 21 sensors. In one embodiment, the ECU 106 may assign the numbers 1 through 21 to those sensors, for example. Such a simple number scheme may be advantageous for faster communication, either to reduce the time required to request information or to assign an order that the sensors should reply to general requests for information.

In one embodiment, to reduce signal interference among sensors 104, the ECU 106 may instruct the sensors 104 to respond only to ECU signals coming from a specific wireless receiver. In one embodiment, sensors are only locked once the ECU 106 has determined to a very high degree of certainty what the function of the sensor is (e.g., that the sensor belongs to the vehicle 100 and not to another vehicle. A possible concern is that the sensor is initially open to any wirelessly enabled ECU reading the sensor and possibly adjusting the rate/timing of its data transmissions. This could cause problems if an ECU of a neighboring vehicle makes a mistake. This could also open the system to abuse by third parties. In some cases, the only risk may be for a third party to know the sensor value. However, where the sensor's behavior can be adjusted, there is possibility of remote hacking, etc., which could be used to damage the vehicle (e.g., disable the sensors or worse). Therefore, the sensors should initially accept instructions from any ECU, but the first to do so can then restrict the sensor from receiving instructions from any other ECU. Generally, this would be achieved by establishing an encrypted communication channel and establishing an identifying number (e.g., MAC number, pass code, etc.), which only the vehicle's ECU has access to. In one embodiment, the ECU 106 may encrypt the sensor-receiver communication in order to protect the communication channel against accidental or casual intrusion.

Next, in step 406, the ECU 106 identifies each of the detected sensors, including the identical sensors, as corresponding to a respective sensor in the list of sensors, based on one or more of the following attributes: a type of information provided by each sensor; a proximity of each sensor relative to at least one wireless receiver; at least one characteristic of the information received from the sensors, that is caused by an actively induced change in the vehicle environment; and at least one characteristic of the information received from the sensors, that is caused by a passive change in the vehicle environment. In particular embodiments, the ECU 106 may identify each of the detected sensors, including the identical sensors, as corresponding to a respective sensor in the list of sensors, based on any combination these attributes. For example, in one embodiment, the combination may include: a proximity of each sensor relative to at least one wireless receiver; and at least one characteristic of the information received from the sensors, that is caused by an actively induced change in the vehicle environment. In one embodiment, the combination may include: at least one characteristic of the information received from the sensors, that is caused by an actively induced change in the vehicle environment; and at least one characteristic of the information received from the sensors, that is caused by a passive change in the vehicle environment. In one embodiment, the combination may include: a proximity of each sensor relative to at least one wireless receiver; and at least one characteristic of the information received from the sensors, that is caused by a passive change in the vehicle environment. These attributes are described in more detail below in connection with FIG. 6.

In one embodiment, the sensors 104 are positioned at fixed distances from the antenna of the network interface unit 206. As such, major changes in signal power may be used to eliminate many sensors from the matching process. For example, in a factory environment, sensors may be eliminated during the first minute as a given car rolls off the production line.

In one embodiment, the ECU 106 may have multiple antenna distributed around the vehicle, which would assist in identifying sensors. Reducing the sensor antenna distance in this way further reduces the likelihood of electrical interference interrupting the flow of data. In one embodiment, to identify each of the detected sensors, the ECU 106 takes a given detected sensor and matches the given sensor against the list of sensors that are expected to be located in the vehicle environment. In one embodiment, the ECU 106 may perform the matching in stages, where the ECU 106 matches the given sensor against particular attributes in the sensor list.

Figure 6:
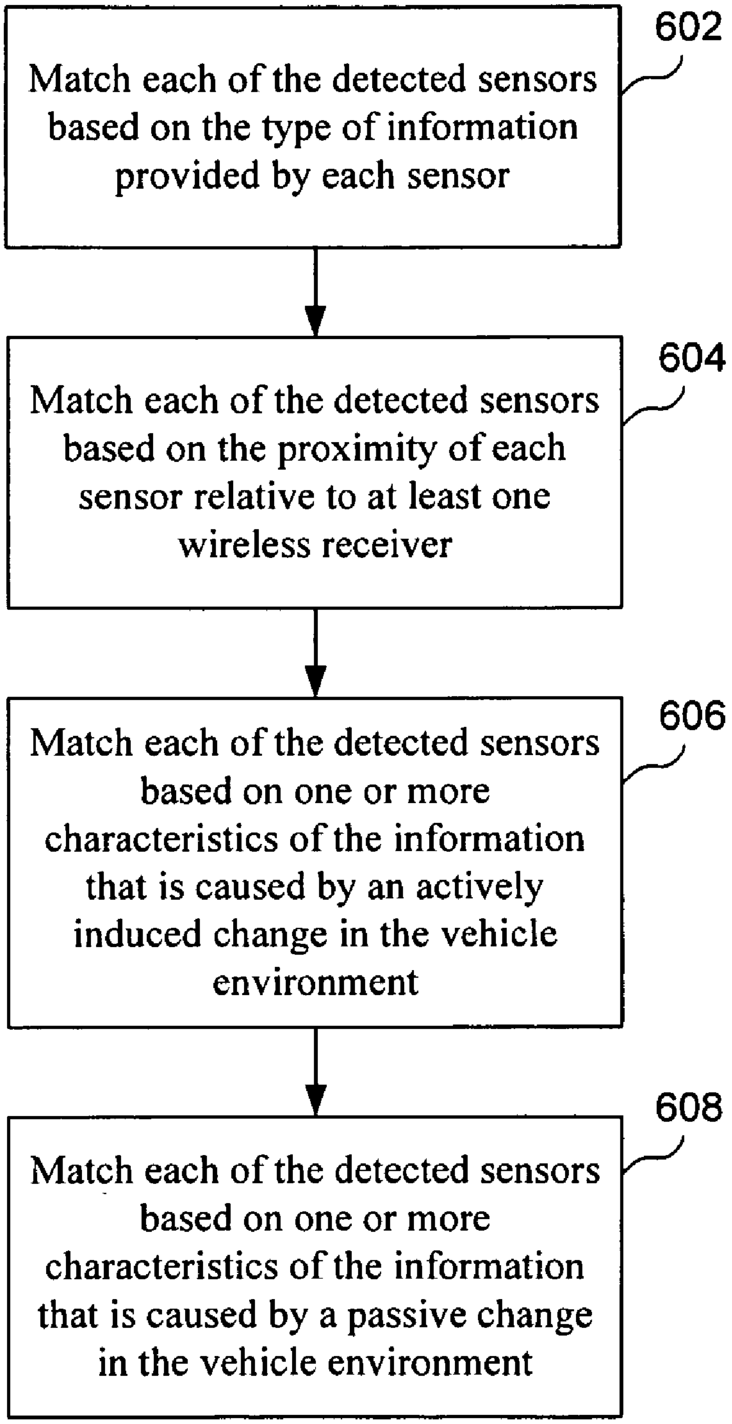
FIG. 6 is a flow chart showing a method for identifying sensors in accordance with one embodiment.

FIG. 6 is a flow chart showing a method for identifying sensors in accordance with one embodiment. Referring to both FIGS. 1 and 6, the process begins in step 602 (also referred to as Stage 1) where the ECU 106 matches each of the detected sensors against the list of sensors 500 in order to identify one or more of the detected sensors based on the type of information provided by each sensor.

Different sensors provide different types of information. For example, a fuel gauge sensor provides the amount of fuel in the fuel tank. In one embodiment, a fuel gauge sensor is considered a specialized or unique sensor, because it provides information for one unique location (e.g., the fuel tank) in the vehicle environment. A temperature sensor is considered a non-specialized sensor, because it can be used in different locations in the vehicle environment. As such, the type of information provided by a given sensor indicates if the sensor is a unique sensor or a known type of sensor. In one embodiment, the ECU 106 determines whether a given sensor 104 is specialized (e.g., unique) or non-specialized by matching information provided by the given sensor 104 to the types of sensors in the list of sensors 500. In this example, if the ECU 106 detects a sensor 104 that provides the amount of fuel in the fuel tank, the ECU 106 would determine that the detected sensor 106 is specialized, because it is the only sensor 104 in the vehicle environment that detects fuels. The ECU 106 then positively matches that detected sensor 104 with the fuel gauge sensor in the list of sensors 500.

In one embodiment, the ECU 106 positively matches most or all of the specialized sensors during Stage 1, as there would be only one match. For the other non-specialized sensors (e.g., pressure sensors), there may be several possible matches during Stage 1. As such, there may or may not be a positive match until a subsequent stage. For example, a given detected sensor 104 may provide pressure information. The ECU 106 would determine that his sensor 104 is non-specialized. This would be the case where there are multiple identical sensors. For example, there may be multiple identical pressure sensors, one associated with each tire. As such, the ECU 106 may not be able to determine whether a given sensor 104 is associated with a particular tire. As such, the identification would be inconclusive until the ECU 106 analyzes more information (e.g., data-trend information) at a later stage.

Next, in step 604 (also referred to as Stage 2), the ECU 106 matches each of the detected sensors 104 against the list of sensors 500 in order to identify one or more of the detected sensors 104 based on the proximity of each sensor relative to one or more receivers 108. In one embodiment, the ECU 106 identifies some sensors to be within a predefined range of one or more receivers 108, yet not detected by one or more other receivers 108. In one embodiment, the ECU 106 determines or measures the signal strength (or relative signal strength) of a given detected sensor and then matches or compares the signal strength of that sensor to expected signal strength in the list of sensors 500. This may (but need not) be a triangulation process. For example, referring to column 510 of FIG. 5, if a given detected sensor is determined to have a high signal strength, and the only expected high signal strength in the list of sensors 500 is associated with the sensor at the passenger seat, the ECU 106 may render this to be a positive match.

Next, in step 606 (also referred to as Stage 3), the ECU 106 matches each of the detected sensors against the list of sensors 500 in order to identify one or more of the detected sensors based on one or more characteristics of the information that is caused by an actively induced change in the vehicle environment. In one embodiment, an actively induced change may include, for example, the user starting the engine 102 of the vehicle 100 or driving the vehicle 100. In particular embodiments, an actively induced change affects at least some of the detected sensors 104. For example, turning on the engine 102 may affect the information provided by the sensors 104 in close proximity to the engine 102 (e.g., temperature sensors in that area) but might not affect some sensors 104 in the passenger area. In one embodiment, the ECU 106 compares information or data from one or more of the detected sensors 104 to data in the list of sensors 500. In one embodiment, the ECU 106 applies an algorithm to statistically match the characteristics of the detected sensors with the characteristics (e.g., data-trends) of the sensors listed on the sensor list 500. In one embodiment, one of the characteristics may be a rate of change over time (e.g., temperature, pressure, etc.) of the data provided by the sensor. Based on any matches, the ECU 106 determines which, if any, sensors 104 have been matched above a predetermined confidence threshold. For example, the data may show that the pressure detected by a given sensor 104 spiked at a particular time in the same manner as the data in column 510 that is associated with the rear right tire in the list of sensors 500. As such, the ECU 106 would determine that the given sensor 104 is indeed the rear right tire sensor. In some scenarios, the pressure is not generally going to spike as the pressure sensor passes the bottom-most point of its circular path. One possibility is that the tire pressure sensor also measures strain in the wall of one part of the tire—and this value should spike or dip. In some scenarios, the pressure may spike if the exit from an assembly line has a bump or if there is a road bump. In such a scenario, the bump is preferably in two off-set sections so that the left tire passes over it at a different time than the right so that the ECU can distinguish between them based on the timing of the pressure spikes.

Next, in step 608 (also referred to as Stage 4), the ECU 106 matches each of the detected sensors against the list of sensors 500 in order to identify one or more of the detected sensors based on one or more characteristics of the information that is caused by a passive change in the vehicle environment. In one embodiment, the passive change in the vehicle environment may be a change in ambient temperature in the vehicle environment (e.g., increase or decrease in the ambient temperature). The ambient temperature may change, for example, during one or more temperature cycles. It is possible that some sensors may not be identified immediately after assembly but instead only after the vehicle engine had mostly or fully heated up or indeed after it had both heated up and cooled down.

In one embodiment, the ECU 106 compares information or data from one or more of the detected sensors to data in the list of sensors 500. In one embodiment, the ECU 106 applies an algorithm to statistically match the characteristics of the detected sensors 104 with the characteristics (e.g., data-trends) of the sensors listed on the list of sensors 500. Based on any matches, the ECU 106 determines which, if any, sensors have been matched above a predetermined confidence threshold. For example, the data may show that the temperature detected by a given sensor 104 increased over time in the same manner as the data in column 510 that is associated with the exhaust manifold in the list of sensors 500. As such, the ECU 106 would determine that the given sensor 104 is indeed the exhaust manifold sensor.

In one embodiment, as shown in column 512 of FIG. 5, the list of sensors 500 indicates the stage during which each of the sensors 104 has been positively matched with detected sensors. For example, if the exhaust manifold sensor is positively matched with a detected sensor during Stage 4, the ECU 106 updates the list of sensors 500 to indicate this, and this update may occur any time after the match is made.

In one embodiment, the ECU 106 may update the list of sensors 500 to indicate any sensors that have not yet been positively matched with detected sensors 104. For example, if the exhaust manifold sensor has not yet been found, column 512 may show an "n/a," "not yet matched," or other suitable indication that a positive match has not been made. This update may occur after any one or more of the steps 602-604 of FIG. 6.

Figure 7:
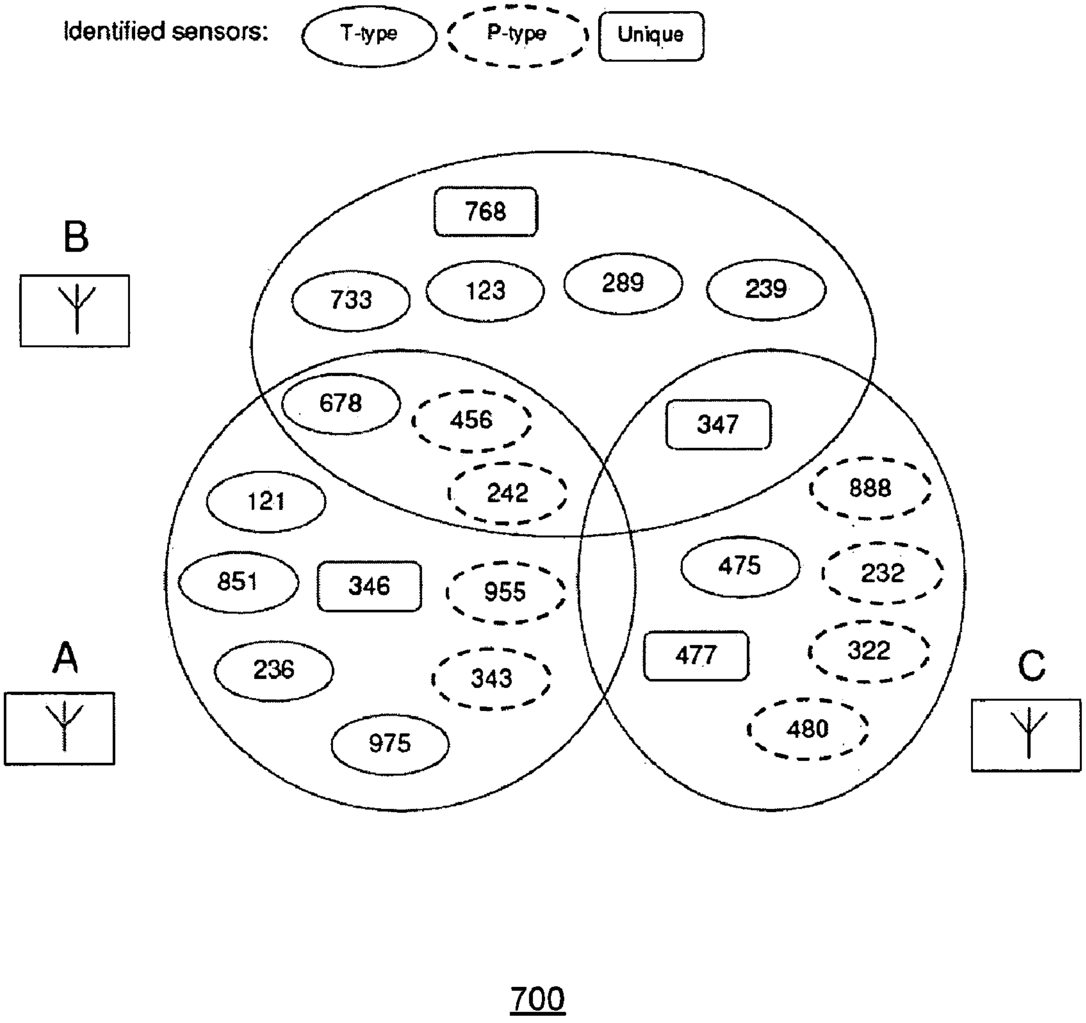
FIG. 7 is a Venn diagram illustrating sensors that three receivers have detected in accordance with one embodiment.

FIG. 7 is a Venn diagram illustrating sensors that three receivers 108 have detected in accordance with one embodiment. FIG. 7 shows three receivers 109, where receiver A is under the chassis, B is under the hood, and C is in the passenger compartment. The T-type sensor measures temperature, P-type sensors measure pressures, and there are a number of specialized sensors (labeled "unique" in FIG. 7). For ease of illustration, these are the only types of sensors shown. In reality, there may be a large number of multi-function sensors that detect temperature, pressure, vibration, etc., as well as waterproof and high-temperature sensors. As FIG. 7 shows, some sensors 104 may be detected by one receiver 108 and some sensors 104 may be detected by more than one receiver 108.

Figure 8:
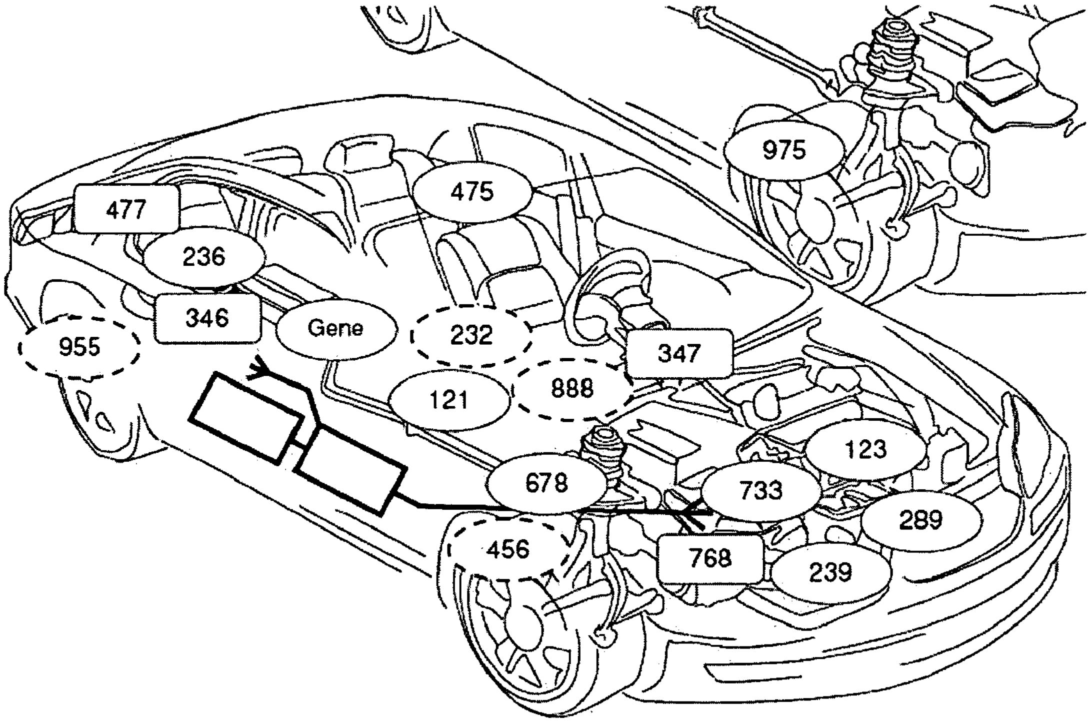
FIG. 8 is a diagram of a vehicle of FIG. 1 where most of the detected sensors have been identified in accordance with one embodiment.

In one embodiment, the three digit numbers represent the MAC numbers or other identification codes of the sensors. FIG. 8 is a diagram of a vehicle 100 of FIG. 1 where most of the detected sensors 104 have been identified in accordance with one embodiment. The sensor (labeled 975) on the second vehicle is not on the list of expected sensors and is thus eliminated by deduction.

Embodiments Directed to Signal Interference

In one embodiment, the ECU 106 may permit some interference rather than shutting down sensor-receiver communication. In one embodiment, the ECU 106 checks less vital sensor information (e.g., tire pressure) infrequently when there are neighboring vehicles closely packed together and may utilize frequency spectrum division in order to minimize signal interference. In one embodiment, the receivers 108 of the ECU 106 operate at the minimum radio strength without a significant increase in communication duration in order to minimize communication errors necessitating communication duplication.

In one embodiment, the ECU 106 may leave large periodic communication gaps in noisy environments in order to collaboratively time-share the frequency space with other vehicles. In particular embodiments, the act of communicating between vehicles may necessitate a stronger radio transmission than communication across part of the vehicle 100. A stronger radio transmission may increase the overall noise. To address this, in one embodiment, the ECU 106 may request information periodically with a standard repeat interval and then reduce the frequency of requests as the vehicle 100 moves away from neighboring vehicles, and also change to a less used time-slot. This process is not so deterministic that two vehicles would simultaneously move to the empty time-slot. As such, there is a degree of randomness in the timing and choice of timeslots.

In one embodiment, a suitable request frequency for low priority sensors is sufficiently low to ensure that closely packed vehicles can communicate effectively. In a specific embodiment, this period could be measured in seconds, which would be faster than the time it takes for two vehicles to pass close to one another. In one embodiment, the ECU 106 utilizes a predetermined frequency band that is divided into much smaller time divisions.

As an example, there may be ten communication bands (0 to 9) with an accepted repeat period of one second divided into ten time slots (0 to 9)—making fifty communication channels (0 to 99). There may also be an eleventh communication band with one hundred time divisions and an accepted repeat frequency of 200 times a second. In this example, the vehicle 100 uses communication channel 48 (e.g., time slot 4 and frequency band 8). The ECU 106 emits a signal 200 times a second on the eleventh frequency band in time-slot 48. As such, all vehicles can monitor the use of the time and frequency spectrum by nearby vehicles and have advanced notice that their communication channel will be heavily used before it is time to use the communication channel. The ECU 106 can change to another time slot on the same frequency band without adding to the ambient noise, with no extra communication, and no computing burden on the sensors.

One possible issue is that the vehicles need to be in exact synchrony in order for the vehicles to communicate their channels to one another. This may be achieved by a periodic (e.g., every 200th of a second) step-wise increase in power emitted on the high frequency band (e.g., eleventh band). The increase may be high (e.g., by a factor of five) but only for one time period. Each vehicle adjusts its timing to fall in-line with neighboring vehicles. In densely packed traffic all the vehicles will quickly lock phase in this way, and remain in the phase locked condition.

By contrast, in an area with very few vehicles, there may be a situation where some groups of vehicles lock phase, leading to domains. This may result in some signal interference among passing cars. However, in this condition, interference can easily be tolerated. It is possible that the data from the low-priority sensors may be interrupted occasionally when two cars using the same channel pass close to one another during the relevant time-slot. In this case, the information will have been interrupted for a only a second, which is no problem when monitoring tire pressure, etc. These embodiments may enable traffic-based LAN, which would permit the transmission of traffic congestion data between vehicles passing in opposite directions.

Further Applications

As noted above, while embodiments of the present invention disclosed herein may be applied in the context of vehicles, embodiments of the present invention may also apply to other vehicles such as trucks and also have non-vehicle applications, and still remain within the spirit and scope of the present invention. Examples are described in detail below.

Figure 9:
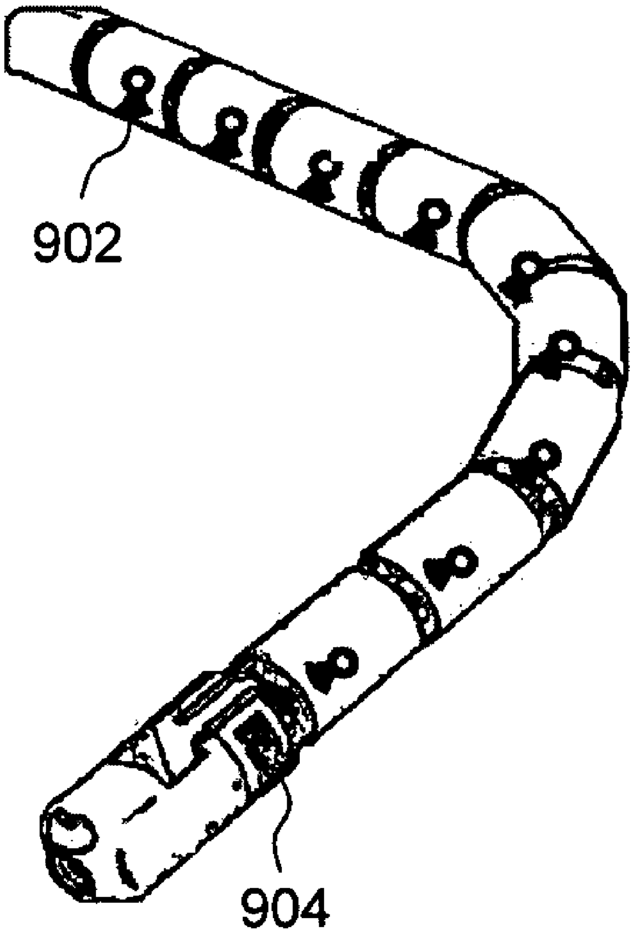
FIG. 9 is a diagram showing a robot in accordance with one embodiment.
Figure 10:
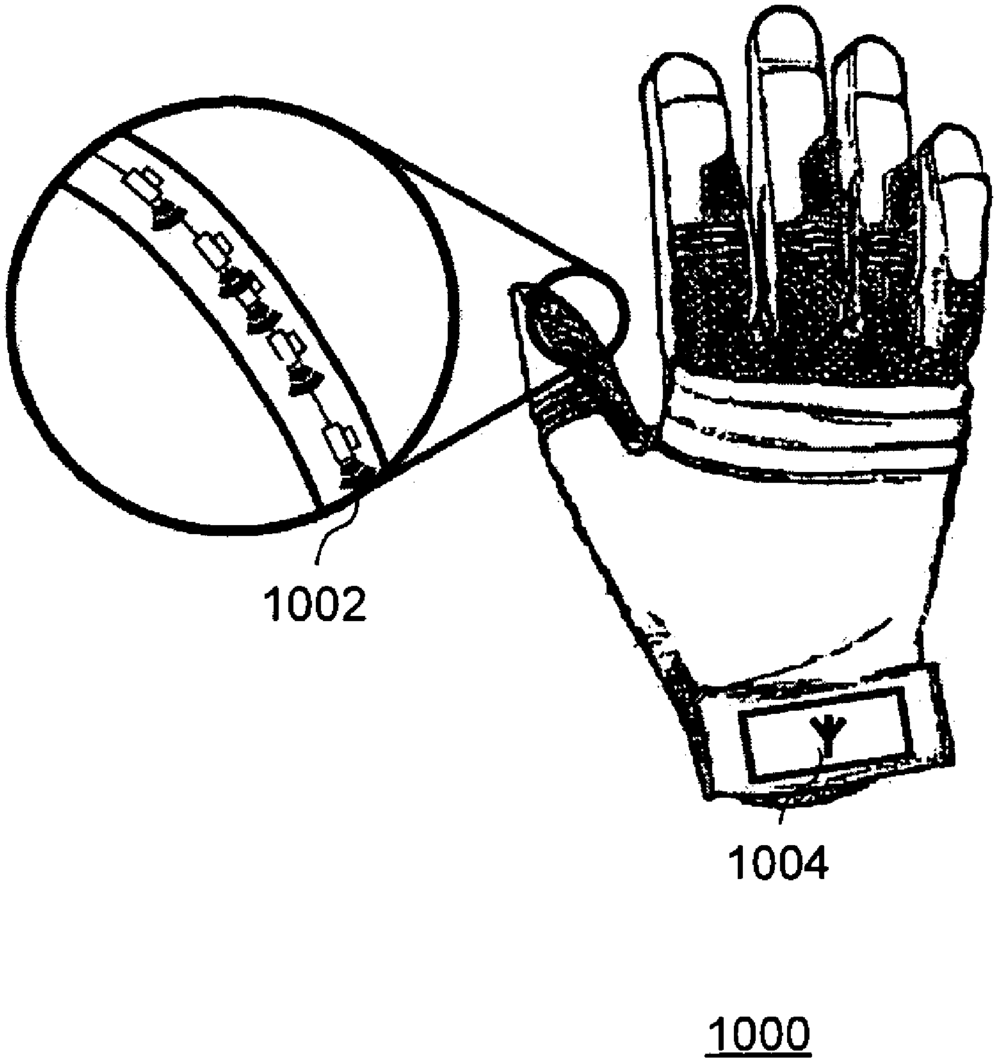
FIG. 10 is a diagram showing a haptic glove in accordance with one embodiment.

Embodiments of the present invention may be applied to robots. FIG. 9 is a diagram showing a robot 900, in accordance with one embodiment. As FIG. 9 shows, the robot 900 includes sensors 902 distributed in various locations at different modules of the robot 900 and includes one or more receivers 904. Embodiments described herein may be applied to identifying, automatically or otherwise, each of the sensors within respective modules. In this embodiment, the robot 900 is a snake-like robot, which may be used for scouting under collapsed buildings, and may include an electronic control unit that controls the robot in order to perform a motion (predetermined or not), and that also identifies each of the sensors according to the embodiments described herein Embodiments of the present invention may be applied to a haptic glove or clothing. FIG. 10 is a diagram showing a haptic glove 1000 in accordance with one embodiment. As FIG. 10 shows, the haptic glove includes sensors 1002 and one or more receivers 1004. The haptic glove 1000 may be used by a user of a virtual environment or a skin for a manipulator of a robot such as the robot 900 described above. As FIG. 10 shows, the sensors are distributed throughout the haptic glove 1000 (or throughout the skin of a robot's hand). Embodiments described herein may be used to identify, which includes locating, each the sensors 1002.

In particular embodiments, the sensors 1002 may be powered by radio waves, radiation, a temperature differential between a user's skin and the environment, electrical energy between two planar elements, which may also serve to sandwich the sensor in place, absorbing radio/microwave energy such as that emitted from a passive radio frequency identification (RFID) reader, etc. or by any other suitable means.

In one embodiment, the sensors 1002 may communicate with an ECU by radio transmission (e.g., RFID) and may transmit electrical, ultrasound or microwave data through a waveguide such as the user's skin, the skin of the haptic glove/clothing. Note that communication through a two dimensional (planar) waveguide (with one or two layers) may be considered to be wireless communication which uses one or more filamental conduits.

In one embodiment, the ECU may identify the sensors 1002 in accordance with the embodiments described herein. For example, the ECU may identify sensors 1002 based on actively induced modification of the glove environment (e.g., a camera and ECU tracks the motion of the glove as controlled by a robot or a user). Actively induced modification may also include the glove surface being pressed or rolled across a reference object such that spikes in pressure are registered by the sensors 1002, which enables the ECU to determine their locations. Alternatively, the glove may be pressed several times against slightly different locations on a test surface (or series of test surfaces), which has a complex arrangement of ridges/bumps. Because many of the sensors 1002 move in tandem, the ECU may utilize an algorithm to identify some or all of the sensors 1002 once a sufficient amount of data is gathered.

In one embodiment, the ECU may stop short of identifying the locations of all the sensors 1002. Instead, the ECU keeps a record of the most likely locations for any as-yet-to-be-located sensors. The ECU may possibly eliminate a location later (e.g., even when the glove is in use), because a given sensor 1002 may experience similar conditions to its closest neighbors. Indeed, it would be possible in some embodiments for the location of each sensor 1002 in the haptic glove (or haptic clothing) to be solely determined in this way, especially after the product has been purchased, and taking into account the shape of the sensor area. In one embodiment, the ECU may optionally utilize data on typical use patterns (e.g., high pressure often experienced at joints) in order to identify the locations of the sensors 1002.

Figure 11:
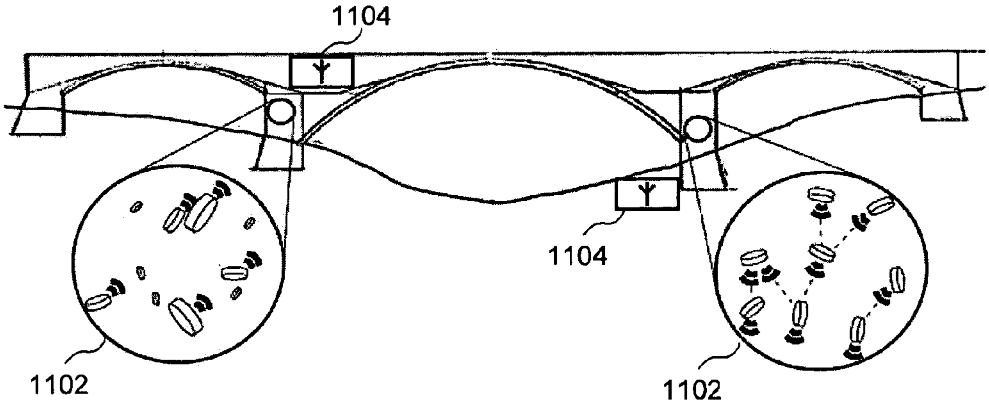
FIG. 11 is a diagram of a bulk structure in accordance with one embodiment.

Embodiments of the present invention may be applied to bulk structures. FIG. 11 is a diagram of a bulk structure 1100 in accordance with one embodiment. As FIG. 11 shows, the bulk structure 1100 is composed of concrete and has sensors 1102 randomly scattered within the building material and/or on the surface of the bulk structure 1100. The bulk structure 1100 may be a bridge, power station, other building, etc. Embodiments described herein may be applied to identifying, automatically or otherwise, each of the sensors within or on the bulk structure 1100. Similar to the ECU 106 described above, an ECU may identify each of the sensors 1102 according to the embodiments described herein.

In one embodiment, power for the sensors 1102 may be obtained from a temperature differential or from the time variation of temperature or other suitable power source. Slow power acquisition may be sufficient to enable weekly data collection. In one embodiment, where the environment (e.g., a large thickness of concrete) may obstruct radio or ultrasound communication between the sensors and a collection point, the sensors 1102 may be permitted or controlled to form a network to relay information.

In one embodiment, each sensor 1102 may communicate directly with the ECU or may identify itself as being N number of steps from a particular collection point (e.g., one or more of the wireless receiver(s) of the ECU). Other sensors 1102 may identify nearby sensors 1102 and select the one with the lowest number of steps from the collection point for communication. These sensors 1102 may identify themselves with an N number of steps plus one. This avoids all sensors transmitting their data in all directions, which may lead to communication redundancy. If the sensors 1102 have this functionality, they may then provide information regarding their location by informing the receiver 1104 which sensors 1102 they can detect and, if possible, the apparent signal strength of the proximate sensors 1102.

In one embodiment, some of the sensors 1102 may detect gas (e.g., CO2, O2, etc.) to enabling monitoring of the setting of concrete or the propagation of cracks. Some of the sensors 1102 may detect radiation to enable monitoring of nuclear power stations. Some of the sensors 1102 may detect vibration to enable monitoring of fatigue. In one embodiment, the ECU may perform some of the steps described above to determine a change in the shape of a sensor carrier. Smart buildings with active movement damping may benefit from vibration or stress sensors throughout the shell or supportive columns. Office air conditioning (A/C) and heating systems may benefit from distributed temperature sensors.

Embodiments of the present invention may be applied to robots. In one embodiment, a robot may be constructed with sensors distributed in various locations such as within different modules of the robot. Embodiments described herein may be applied to identifying, automatically or otherwise, each of the sensors within respective modules. For example, a snake-like robot for scouting under collapsed buildings may include an electronic control unit that controls the robot to perform a motion (predetermined or not) and that also identifies sensors associated with the robot according to the embodiments described herein.

According to the method and system disclosed herein, the present invention provides numerous benefits. For example, embodiments of the present invention provide detection and identification of sensors in the vehicle in a simple and cost effective manner.

A method and system in accordance with the present invention for identifying sensors have been disclosed. In particular embodiments, the ECU detects wireless sensors in a vehicle environment and identifies each of the sensors based one or more of the following: the type of information provided by each sensor; the proximity of each sensor relative to at least one wireless receiver; at least one characteristic of the information that is caused by an actively induced change in the vehicle environment; and at least one characteristic of the information that is caused by a passive change in the vehicle environment.

The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable storage medium such as memory or CD-ROM, or is to be transmitted over a network, and is to be executed by a processor. The computer-readable medium may include a computer readable signal, which may be, for example, transmitted over a network. Data resulting from embodiments of the present invention may be stored in a computer-readable storage medium, transmitted over a network, and displayed to a user. Accordingly, many modifications may be made by one of ordinary skill in the art without departing from the spirit and scope of the appended claims.

What is claimed is:

1. A method for identifying sensors in a vehicle environment, comprising:

receiving a list of sensors that are differentiated by function and/or location and are expected to be located in the vehicle environment, said list of sensors comprising at least one characteristic of information provided by each listed sensor;

detecting a plurality of sensors in the vehicle environment, wherein at least some of the sensors are identical;

receiving information from each of the plurality of sensors; and identifying each detected identical sensor as corresponding to a respective sensor in the list of sensors, based on one or more of:

a proximity of each detected identical sensor relative to at least one wireless receiver;

a comparison of at least one characteristic of information received from the detected identical sensors, which is caused by an actively induced change in the vehicle environment, with the listed characteristics; and at least one characteristic of information received from the detected identical sensors, which is caused by a passive change in the vehicle environment.

2. The method of claim 1, wherein the list of sensors comprises, for each sensor:

a sensor identifier; and a sensor type.

3. The method of claim 2 further comprising updating the list of sensors to indicate any of the listed sensors that have not yet been positively matched with the detected sensors.

4. The method of claim 1 further comprising:

matching each of the detected sensors against the list of sensors.

5. The method of claim 1 wherein the type of information provided by each sensor indicates if the sensor is a specialized or non-specialized sensor.

6. The method of claim 1 wherein the sensors are wireless sensors.

7. The method of claim 1 wherein the proximity of each sensor relative to at least one wireless receiver is determined by:

determining a signal strength of a given sensor; and matching the signal strength of the given sensor to an expected signal strength.

8. The method of claim 1 wherein the actively induced change in the vehicle environment comprises the vehicle being driven.

9. The method of claim 1 wherein the passive change in the vehicle environment comprises a change in ambient temperature in the vehicle environment.

10. The method of claim 1 wherein at least one of the sensors is powered by vibration.

11. A system for identifying sensors in a vehicle environment, the system comprising:

an engine;

a plurality of sensors coupled to the engine; and an electronic control unit coupled to the engine, wherein the electronic control unit is operable to:

receive a list of sensors that are differentiated by function and/or location and are expected to be located in the vehicle environment, said list of sensors comprising at least one characteristic of information provided by each listed sensor;

detect a plurality of sensors in the vehicle environment, wherein at least some of the sensors are identical;

receive information from each of the plurality of sensors; and identify each of detected identical sensor as corresponding to a respective sensor in the list of sensors, based on one or more of:

a proximity of each sensor relative to at least one wireless receiver;

a comparison of at least one characteristic of information received from the identical sensors, which is caused by an actively induced change in the vehicle environment, with the listed characteristics; and at least one characteristic of information received from the identical sensors, which is caused by a passive change in the vehicle environment.

12. The system of claim 11, wherein the list of sensors comprises, for each sensor:

a sensor identifier; and a sensor type.

13. The system of claim 11 wherein the electronic control unit is further operable to:

match each of the detected sensors against the list of sensors.

14. The system of claim 11 wherein the type of information provided by each sensor indicates if the sensor is a specialized or non-specialized sensor.

15. The system of claim 11 wherein the sensors are wireless sensors.

16. The system of claim 11 wherein the proximity of each sensor relative to at least one wireless receiver is determined by:

determining a signal strength of a given sensor; and matching the signal strength of the given sensor to an expected signal strength.

17. The system of claim 11 wherein the actively induced change in the vehicle environment comprises the vehicle being driven.

18. The system of claim 11 wherein the passive change in the vehicle environment comprises a change in ambient temperature in the vehicle environment.

19. The system of claim 11 wherein at least one of the sensors is powered by vibration.

20. A vehicle comprising:

an engine;

a plurality of sensors coupled to the engine; and an electronic control unit coupled to the engine, wherein the engine, plurality of sensors, and electronic control unit are in a vehicle environment associated with the vehicle, wherein the electronic control unit is operable to:

receive a list of sensors that are differentiated by function and/or location and are expected to be located in the vehicle environment, said list of sensors comprising at least one characteristic of information provided by each listed sensor;

detect a plurality of sensors in the vehicle environment, wherein at least some of the sensors are identical;

receive information from each of the plurality of sensors; and identify each detected identical sensor as corresponding to a respective sensor in the list of sensors, based on one or more of:

a proximity of each sensor relative to at least one wireless receiver;

a comparison of at least one characteristic of information received from the identical sensors, which is caused by an actively induced change in the vehicle environment, with the listed characteristics; and at least one characteristic of information received from the identical sensors, which is caused by a passive change in the vehicle environment.

* * * * *